US006779088B1

(12) United States Patent
Benveniste et al.

(10) Patent No.: US 6,779,088 B1
(45) Date of Patent: Aug. 17, 2004

(54) VIRTUAL UNCOMPRESSED CACHE SIZE CONTROL IN COMPRESSED MEMORY SYSTEMS

(75) Inventors: Caroline D. Benveniste, New York, NY (US); Peter A. Franaszek, Mt. Kisco, NY (US); John T. Robinson, Yorktown Heights, NY (US)

(73) Assignee: International Business Machines Corporation, Armonk, NY (US)

( * ) Notice: Subject to any disclaimer, the term of this patent is extended or adjusted under 35 U.S.C. 154(b) by 469 days.

(21) Appl. No.: 09/694,876

(22) Filed: Oct. 24, 2000

(51) Int. Cl.[7] .............................................. G06F 12/08
(52) U.S. Cl. ........................ 711/145; 711/144; 711/156; 711/170; 709/247; 710/68
(58) Field of Search ............................... 711/113, 118, 711/119, 122, 117, 203, 205, 207, 170, 171, 156, 144, 159, 160, 145; 707/101; 710/68; 709/247

(56) References Cited

U.S. PATENT DOCUMENTS

| | | | | |
|---|---|---|---|---|
| 5,394,534 A | * | 2/1995 | Kulakowski et al. ........ | 711/112 |
| 5,761,536 A | | 6/1998 | Franaszek ..................... | 710/68 |
| 5,812,817 A | * | 9/1998 | Hovis et al. ................. | 711/173 |
| 5,864,859 A | | 1/1999 | Franaszek .................... | 707/101 |
| 5,936,616 A | * | 8/1999 | Torborg et al. .............. | 711/118 |
| 6,173,381 B1 | | 1/2001 | Dye ............................. | 711/170 |
| 6,208,273 B1 | * | 3/2001 | Dye et al. ..................... | 710/68 |
| 6,349,372 B1 | * | 2/2002 | Benveniste et al. ......... | 711/159 |
| 6,353,871 B1 | * | 3/2002 | Benveniste et al. ............ | 711/3 |
| 6,523,102 B1 | * | 2/2003 | Dye et al. ................... | 711/170 |
| 6,539,460 B2 | * | 3/2003 | Castelli et al. .............. | 711/154 |
| 6,549,995 B1 | * | 4/2003 | Schulz et al. ............... | 711/202 |

OTHER PUBLICATIONS

Feb. 1, 2002. Cache system having ability to store compressed and uncompressed data lines, IBM Technical Disclosure, Issue 454, p. 316, Feb. 2002.*

* cited by examiner

*Primary Examiner*—Pierre Bataille
(74) *Attorney, Agent, or Firm*—Scully, Scott, Murphy & Presser; Derek S. Jennings

(57) ABSTRACT

A compressed memory system includes a cache, and compressed memory including fixed size storage blocks for storing both compressed data segments and fixed size storage blocks defining a virtual uncompressed cache (VUC) for storing uncompressed data segments to enable reduced data access latency. The compressed memory system implements a system and method for controlling the size of the VUC so as to optimize system performance in a manner which permits the avoidance of operating system intervention which is required in certain circumstances for correct system operation. The system solves-these problems by implementing one or more thresholds, which may be set by the operating system, but which, after being sets control the size of the VUC independently of the operating system or other system software.

25 Claims, 7 Drawing Sheets

VIRTUAL UNCOMPRESSED CACHE SIZE CONTROL IN COMPRESSED MEMORY SYSTEMS

BACKGROUND OF THE INVENTION

1. Field of the Invention

This invention relates generally to compressed memory systems, and more specifically, to a system and method for managing and controlling the size of a virtual uncompressed cache (VUC) for optimizing system performance independently of the operating system or other system software.

2. Discussion of the Prior Art

FIG. 1 shows the overall structure of an example computer system implementing compressed main memory. In FIG. 1, a central processing unit (CPU) 102 reads data to and writes data from a cache 104. Cache misses and stores result in reads and writes to a compressed main memory 108 by means of a compression controller 106. The compressed main memory 108 is typically divided into a number of logically fixed size segments (the units of compression, also called lines), but in which each such logical segment is physically stored in a compressed format. It is understood that a segment may be stored in an uncompressed format if it cannot be compressed. Exemplary compressed memory systems may be found in commonly-owned issued U.S. Pat. No. 5,761,536 entitled System and Method for Reducing Memory Fragmentation by Assigning Remainders to Share Memory Blocks on a Best Fit Basis and issued U.S. Pat. No. 5,864,859 entitled System and Method of Compression and Decompression using Store Addressing the contents and disclosure of each of which are incorporated by reference as if fully set forth herein. Another compressed memory system incorporated by reference includes Design and Analysis of Internal Organizations for Compressed Random Access Memories by P. Franaszek and J. Robinson, IBM Research Report RC 21146, IBM Watson Research Center, Oct. 20, 1998.

FIG. 2 shows in more detail the structure of the cache 104, components of the compression controller 106, and compressed main memory 108 of FIG. 1. The compressed main memory is implemented using a conventional RAM memory M 210, which is used to store a directory D 220 and a number of fixed size blocks 230. The cache 240 is implemented conventionally using a cache directory 245 for a set of cache lines 248. The compression controller 260 includes a decompressor 262 used for reading compressed data, a compressor 264 used for compressing and writing data, a number of memory buffers 266 used for temporarily holding uncompressed data, and control logic 268. Each cache line is associated with a given real memory address 250. Unlike a conventional memory, however, the address 250 does not refer to an address in the memory M 210; rather the address 250 is used to determine a directory index 270 into the directory D 220. Each directory entry contains information (shown in more detail in FIG. 3) which allows the associated cache line to be retrieved. The units of compressed data referred to by directory entries in D 220 may correspond to cache lines 248; alternatively, the unit of compression may be larger, that is, sets of cache lines (segments) may be compressed together. For simplicity, the following examples assume the units of compressed data correspond to cache lines 248; the directory entry 221 for line 1 associated with address A1 271 is for a line which has compressed to a degree in which the compressed line can be stored entirely within the directory entry; the directory entry 222 for line 2 associated with address A2 272 is for a line which is stored in compressed format using a first full block 231 and second partially filled block 232; finally, the directory entries 223 and 224 for line 3 and line 4 associated with addresses A3 273 and A4 274 are for lines stored in compressed formats using a number of full blocks (blocks 233 and 234 for line 3, and block 235 for line 4) and in which the remainders of the two compressed lines have been combined in block 236.

FIG. 3 shows some possible examples of directory entry formats. For this example, it is assumed that the blocks 230 of FIG. 2 are of size 256 bytes and that the cache lines 248 of FIG. 2 are of size 1024 bytes. This means that lines can be stored in an uncompressed format using four blocks. For this example, directory entries of size 16 bytes are used, in which the first byte consists of a number of flags; the contents of the first byte 305 determines the format of the remainder of the directory entry. A flag bit 301 specifies whether the line is stored in compressed or uncompressed format; if stored in uncompressed format, the remainder of the directory entry is interpreted as for line 1 310, in which four 30 bit addresses give the addresses in memory of the four blocks containing the line. If stored in compressed format, a flag bit 302 indicates whether the compressed line is stored entirely within the directory entry; if so, the format of the directory entry is as for line 3 330, in which up to 120 bits of compressed data are stored. Otherwise, for compressed lines longer than 120 bits, the formats shown for line 1 310 or line 2 320 may be used. In the case of the line 1 310 format, additional flag bits 303 specify the number of blocks used to store the compressed line, from one to four 30 bit addresses specify the locations of the blocks, and finally, the size of the remainder, or fragment, of the compressed line stored in the last block (in units of 32 bytes) together with a bit indicating whether the fragment is stored at the beginning or end of the block, is given by four fragment information bits 304. Directory entry format 320 illustrates an alternative format in which part of the compressed line is stored in the directory entry (to reduce decompression latency); in this case, addresses to only the first and last blocks used to store the remaining part of the compressed line are stored in the directory entry, with intervening blocks (if any) found using a linked list technique, that is, each block used to store the compressed line has, if required, a pointer field containing the address of the next block used to store the given compressed line.

Another issue in such systems is that the compression of the data stored in the compressed memory system can vary dynamically. If the amount of free space available in the compressed memory becomes sufficiently low, there is a possibility that a write-back of a modified cache line could fail. To prevent this, interrupts may be generated when the amount of free space decreases below certain thresholds, with the interrupts causing OS (operating system) intervention so as to prevent this from occurring. An exemplary method for handing this problem is described in commonly-owned, co-pending U.S. patent application Ser. No. 09/021,333 entitled Compression Store Free Space Management, filed Feb. 10, 1998.

In such systems, it has been found advantageous in certain cases to maintain a number of recently used segments in an uncompressed format (regardless of whether they can be compressed): this is referred to as a virtual uncompressed cache. Further details regarding the by implementation of a VUC may be found in commonly-owned, U.S. patent application Ser. No. 09/315,069 entitled Virtual Uncompressed Cache for Compressed Main Memory, U.S. Pat. No. 6,349, 372 filed May 19, 1999 the contents and disclosure of which is incorporated by reference as if fully set forth herein.

Because a virtual uncompressed cache (VUC) does not consist of a memory partition, for example, but rather is a logical entity consisting of a subset of all segments in the compressed memory system, the size of the VUC may vary dynamically.

It would thus be highly desirable to provide a system and method for managing the size of the VUC in a simple, cost-effective way, and, if possible, without the generation of interrupts and subsequent OS intervention.

SUMMARY OF THE INVENTION

It is thus an object of the invention to control the size of the VUC so as to: (1) optimize system performance; and (2) avoid, if possible, operating system intervention which is required in certain circumstances for correct system operation (e.g., enough free memory space in the compressed memory system must be available at any point in time so as to guarantee that a certain number of modified cache lines in the caches above the compressed memory can be written back).

Thus, according to the principles of the invention, for a compressed memory system including a cache wherein the compressed memory comprises fixed size storage blocks for storing both compressed data segments and fixed size storage blocks defining a virtual uncompressed cache (VUC) for storing uncompressed data segments to enable reduced data access latency, there is provided a system and method for controlling the size of the VUC comprising: maintaining a count of free fixed size storage blocks in the compressed memory system; providing directory structure having entries for locating both uncompressed data segments and compressed data segments for handling cache miss events in the compressed memory system, wherein a CPU generated real memory address is translated into a physical memory locations using the directory, each directory entry including a status flag indicating compressibility status of the segment; for each cache miss event received, accessing a corresponding directory entry and checking status of its corresponding data segment to determine whether the entry is already compressed; and, comparing a current count of the free storage blocks against one or more thresholds for managing a size of the VUC when cache miss events are received.

Advantageously, one or more VUC size thresholds may be set by the operating system for controlling the size of the VUC independently of the operating system or other system software.

BRIEF DESCRIPTION OF THE DRAWINGS

Further features, aspects and advantages of the apparatus and methods of the present invention will become better understood with regard to the following description, appended claims, and accompanying drawings where:

DETAILED DESCRIPTION OF THE PREFERRED EMBODIMENTS

Figure 1:
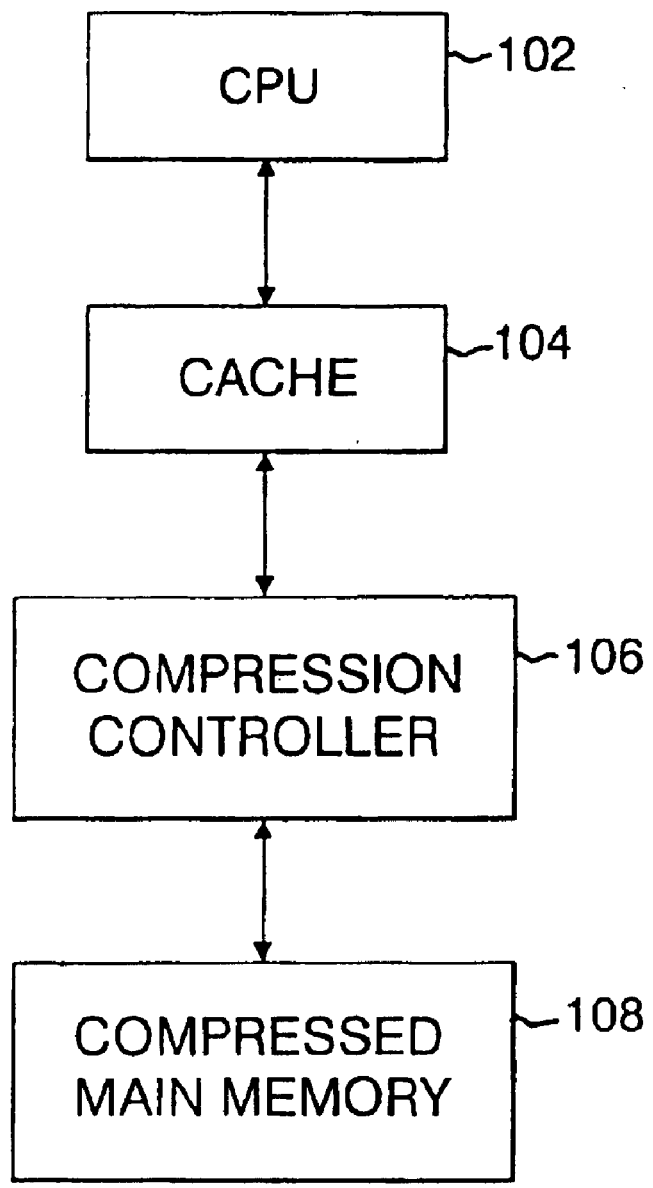
FIG. 1 illustrates conceptually a typical computer system structure implementing compressed main memory.
Figure 2:
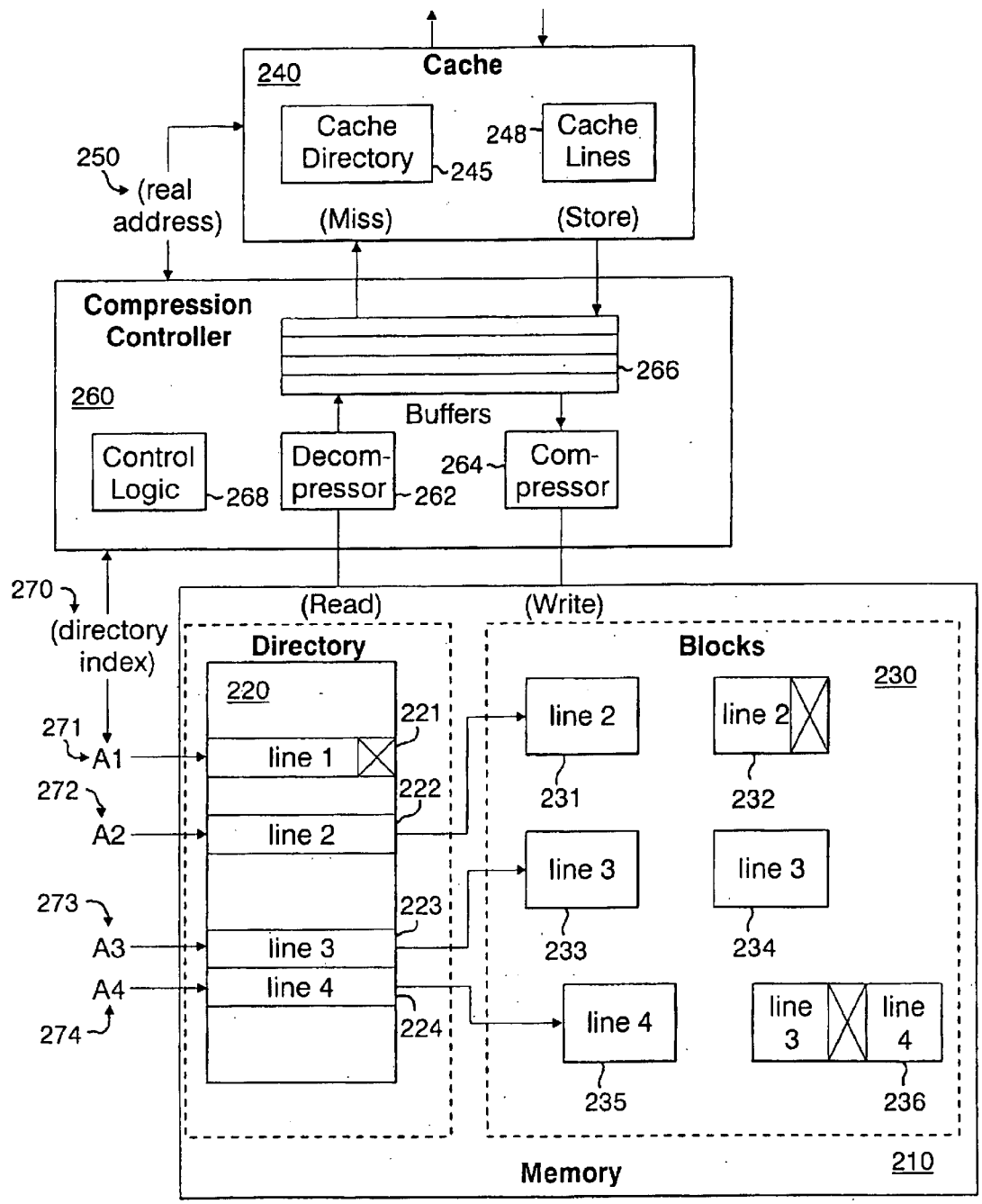
FIG. 2 illustrates the organization of a compressed main memory system according to the prior art.

As described with respect to FIG. 2, each compressed segment in the compressed memory system is stored using one or more blocks, where blocks are fixed size units of memory smaller than the logical segment size (highly compressible segments may also be stored in a directory entry for the line, in which case no blocks are required). The blocks that are not currently in use for storing segments are referred to as free blocks; a list of free blocks is maintained, along with a count F of the number of free blocks. In order to guarantee that modified cache lines can be written out, the number of free blocks must not be allowed to fall below certain minimum values. For this purpose, certain thresholds on F may be set, in which if F falls below these thresholds, interrupts are generated, with subsequent operating system (OS) intervention, as described for example in above-referenced commonly-owned, co-pending U.S. patent application Ser. No. 09/021,333, the contents and disclosure of which is incorporated by reference as if fully set forth herein.

Figure 4:
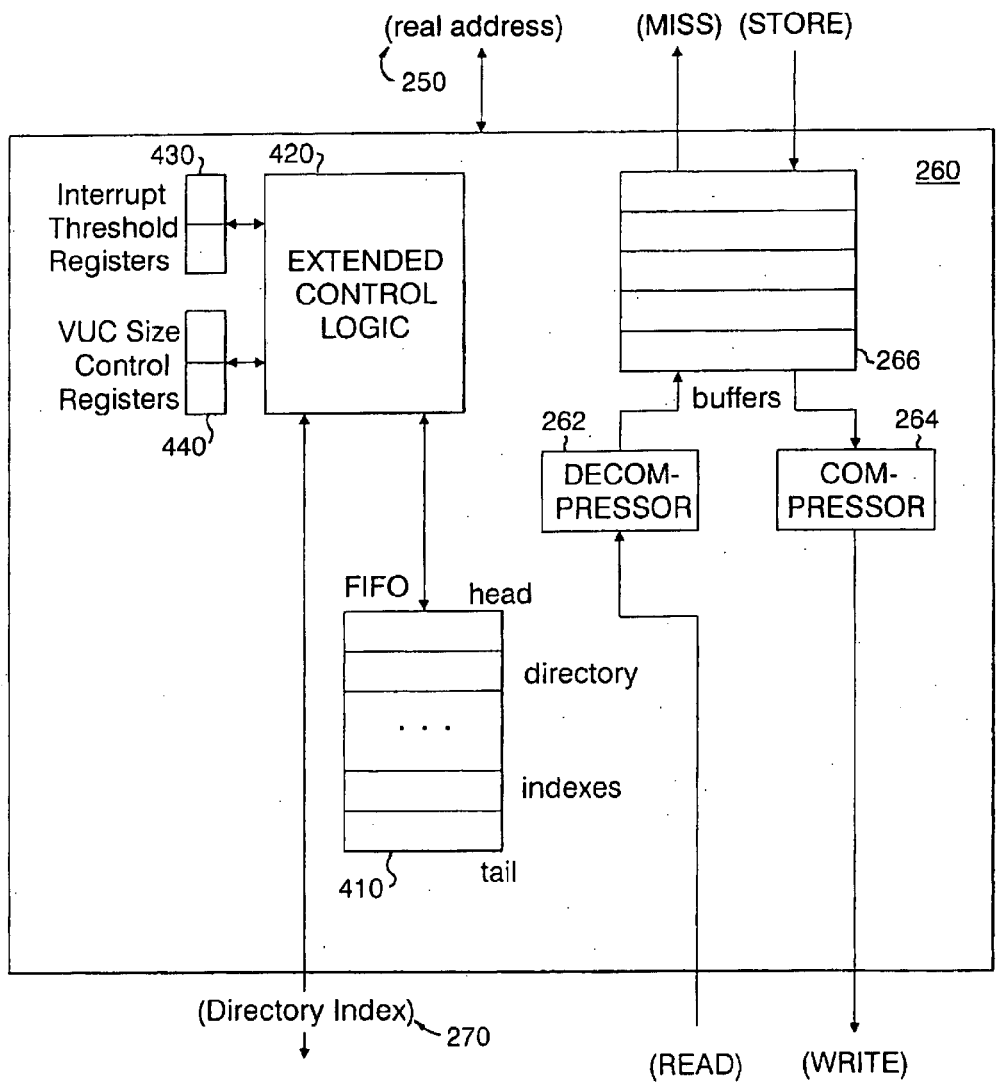
FIG. 4 illustrates the an example FIFO implementation of virtual uncompressed cache with interrupt and size control registers according to the preferred embodiment of the invention.

It is desirable to avoid reaching these thresholds; for this purpose, additional thresholds on F, larger than the thresholds used to generate interrupts, may be used. FIG. 4 illustrates one embodiment of the invention, depicting how the compression controller 260 (FIG. 2) is extended to include a FIFO unit 410, interrupt threshold registers 430, and VUC size control registers 440, together with extended control logic 420 that makes use of the FIFO 410 and VUC size control registers 440 to manage the virtual uncompressed cache. The use of the interrupt threshold registers 430 by the extended control logic 420 is as in the previously cited reference, for example. The VUC size control registers are set by means of special instructions issued by the OS. For illustrative purposes only, this embodiment uses a FIFO list implemented in hardware (alternatively, the FIFO could be stored using blocks of main memory). This FIFO will contain a list of directory indexes (270 in FIG. 2) of the segments currently residing in the virtual uncompressed cache. That is, each segment referred to by a directory entry in the FIFO will be stored in uncompressed format, and the collection of all such segments forms the virtual uncompressed cache.

Figure 3:
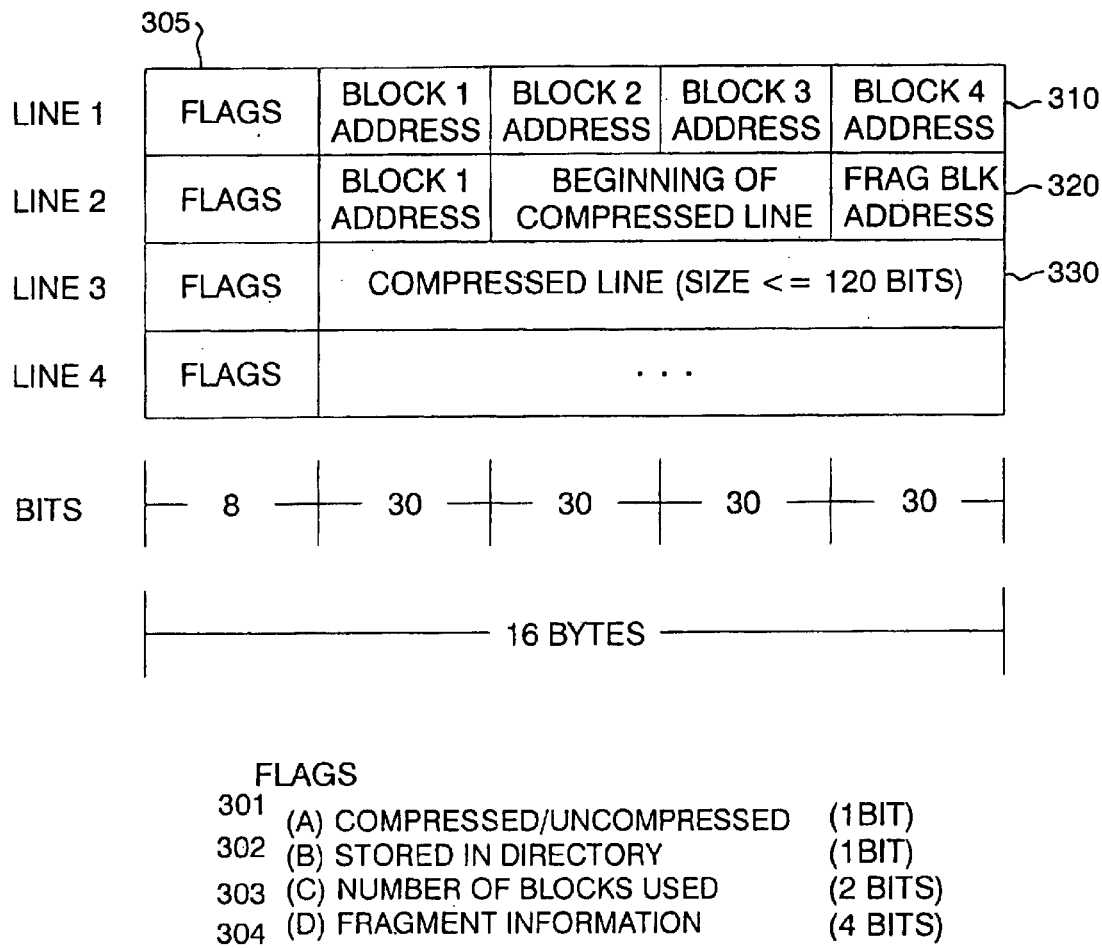
FIG. 3 depicts example directory entry formats for the compressed main memory system according to the prior art.

Note that using a FIFO implementation, excluding the head and tail of the FIFO, the contents of the FIFO can only be found by a linear scan. It is desirable, when accessing a segment, to quickly determine if the directory index for the segment is currently stored in the FIFO or not. Since a linear scan of the FIFO could be excessively time consuming, an alternative is to extend the directory entry formats previously shown in FIG. 3 so as to indicate the status of a segment with respect to its membership in the virtual uncompressed cache (i.e., whether the directory index is contained in the FIFO). For example, for the directory formats of FIG. 3, this can be done without introducing additional flag bits, since every segment referred to by the FIFO is known to be stored in uncompressed format. In the case that the uncompressed flag (301 of FIG. 3) is set to uncompressed, the remaining flags are unused for this case, and are, therefore, available for other uses. For example, a second flag bit 302 of FIG. 3 could be interpreted, when set and when the segment is marked as uncompressed, to indicate that the directory index is in the FIFO (i.e., "IN-FIFO"), and interpreted when clear and when the segment is marked as uncompressed, to indicate that the directory index is not in the FIFO. This is described only as an extended example; similar extensions could be made for other possible directory entry formats.

Figure 5:
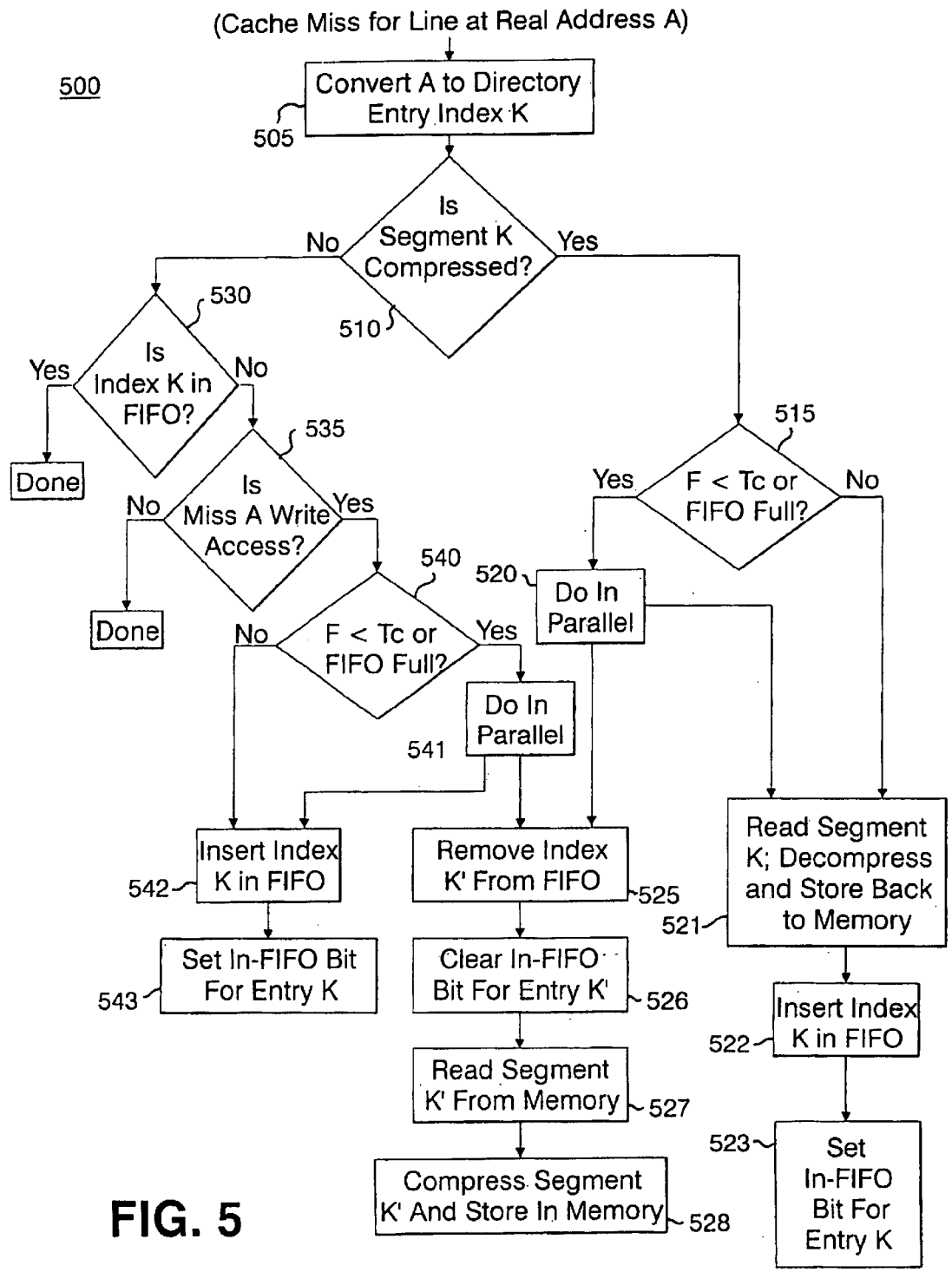
FIG. 5 depicts a control flow methodology implementing a threshold for virtual uncompressed cache size control according to a first embodiment of the invention.

More particularly, according to a first embodiment of the invention, a single threshold Tc, is implemented as follows: when F<Tc (that is, the number of free blocks is less than Tc), the size of the VUC is held constant; otherwise, the size of the VUC is allowed to grow (providing the FIFO does not become full). FIG. 5 illustrates the methodology implemented by the extended control logic block of the compression controller. In a first step 505, in response to a cache miss (in the cache 240 of FIG. 2, for example) for some cache line at real memory address A, the memory address A is converted to a directory entry index K (hereinafter, "entry K"). The segment referred to by entry K is hereinafter referred to as "segment K". In addition to the uncompressed segments in the virtual uncompressed cache, certain other segments are also stored in uncompressed format, since, for example, it may be found that the data in the segment does not compress. Therefore, in step 510, a determination is made as to whether the flag bit in entry K indicates that the segment K is compressed. If it is uncompressed, control proceeds to step 530, where the second flag bit in entry K is examined to see if the entry is currently stored in the FIFO 410 (of FIG. 4). If the flag bit in entry K indicates that the entry is currently stored in the FIFO, processing is complete (i.e., the segment being accessed is already in the virtual uncompressed cache). Otherwise, at step 530, if it is determined that the uncompressed segment is not in the virtual uncompressed cache, the process proceeds to step 535 where it is determined whether the cache miss is a read access. Since there is no performance benefit in adding a segment that does not compress to the virtual uncompressed cache in the case of read operations (which do not change the data), then if the miss is a read access, processing is again complete. However, a write access will change the data in the segment, in which case the line may become compressible. Therefore, at step 535, if it is determined that the miss is a write access, control proceeds to step 540, where a determination is made as to whether F<Tc (that is, if the number of free blocks is below the threshold Tc) or whether the FIFO is full. If F is equal to or greater than Tc (and the FIFO is not full), then at step 542, the directory entry K is inserted in the FIFO, and the "IN-FIFO" flag bit is set at step 543. Otherwise, at step 540, if F is less than Tc, control proceeds to step 541, which initiates two parallel sequences of operations. The first sequence comprises steps 542 and 543, wherein the directory entry K is inserted in the FIFO and the "IN-FIFO" flag bit is set. However, since the number of free blocks has fallen below the threshold (or the FIFO is full), an item is removed from the FIFO, which entails logically removing a segment from the virtual uncompressed cache. This is accomplished by the following steps: at step 525, a directory index K' is found by removing the item at the tail of the FIFO; at step 526, having found and read entry K', the "IN-FIFO" flag bit is cleared for the entry K'; at step 527, the segment K' is read from memory; and, at step 528, the segment K' is compressed and stored back to memory (where one possible result, as discussed above, is that the segment does not compress and is, therefore, left uncompressed, but not in the FIFO).

Returning to step 510, if it is determined that the flag bit in entry K indicates that the segment K is compressed the process proceeds to step 515, where a determination is made as to whether F<Tc (or if the FIFO is full). If, at step 515, it is determined that F is equal to or greater than Tc (and the FIFO is not full), then segment K may be added to the virtual uncompressed cache without removing another segment from the virtual uncompressed cache. Thus, the process proceeds to step 521, where segment K is read from memory; decompressed; and stored back to memory. Segment K is now stored in uncompressed format. Next, at step 522, the directory index K is inserted at the head of the FIFO; and, at step 523, the "IN-FIFO" flag bit for entry K is set.

If, at step 515, it is determined that F<Tc (or that the FIFO is full), control proceeds to step 520, which initiates two parallel sequences of operations. In a first sequence, the segment referred to by the tail of the FIFO is logically removed from the virtual uncompressed cache as described herein with respect to steps 525, 526, 527, and 528. The second parallel sequence, comprise steps 521, 522, 523, which logically adds segment K to the virtual uncompressed cache, with directory index K at the head of the FIFO.

Figure 6:
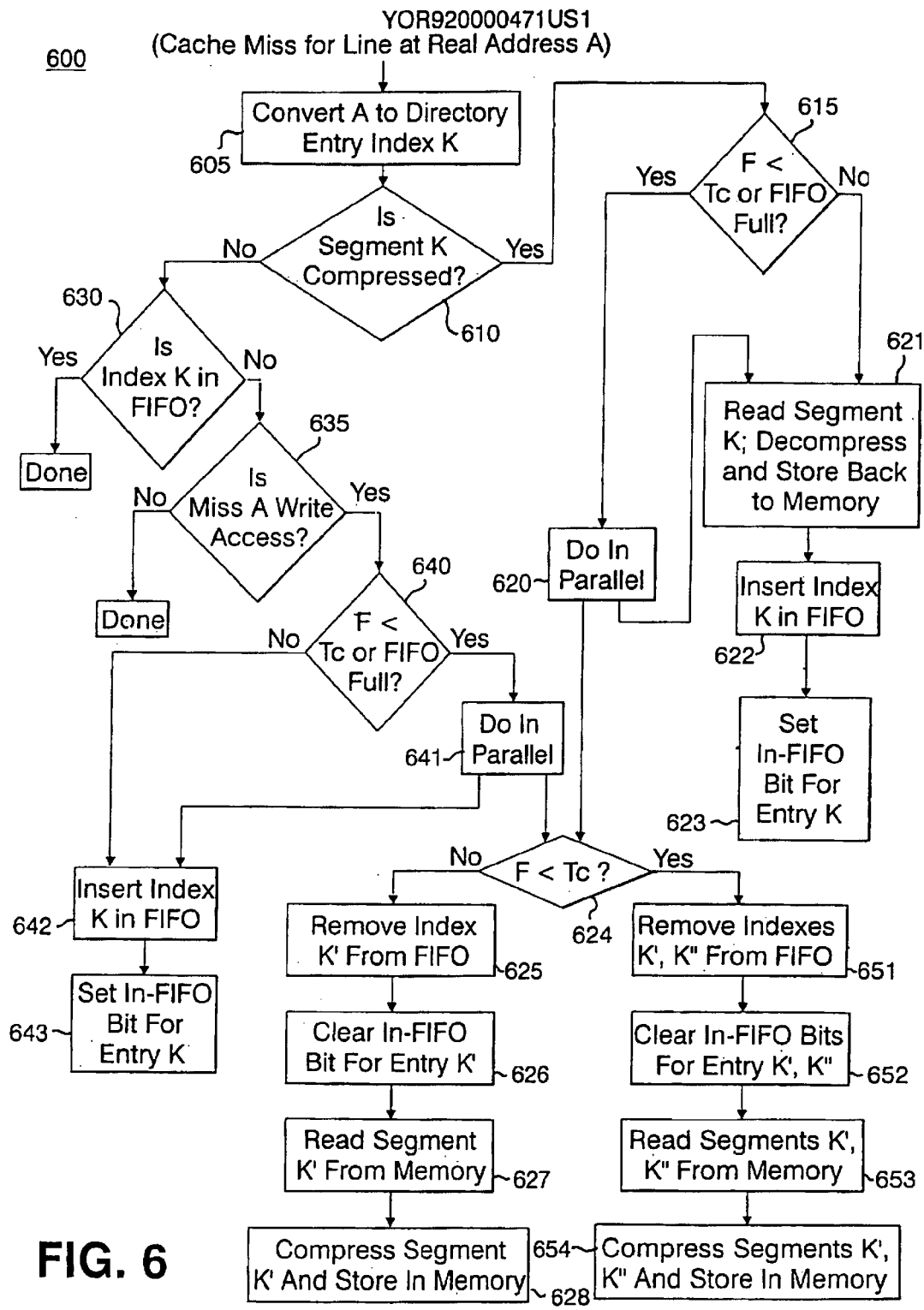
FIG. 6 depicts a control flow methodology implementing two thresholds for virtual uncompressed cache size control according to a second embodiment of the invention; and, FIG. 7 depicts a control flow methodology implementing a single threshold and a removal loop according to a third embodiment of the invention.

In this first embodiment of the invention described with respect to FIG. 5, it is understood that once F<Tc, the number of elements in the FIFO (and, therefore, the size of the VUC) is held constant; i.e., for each segment added to the VUC, another segment is removed. However, if the overall compressibility of the data in the compressed memory system decreases, then F will also decrease. In such a case, it is desirable to decrease the size of the FIFO. This can be done using an additional threshold Tt, where Tt<Tc, and is implemented in accordance with a second embodiment of the invention as now described with respect to FIG. 6. In FIG. 6, at step 605, in response to a cache miss for some cache line at real memory address A, the memory address A is converted to a directory entry index K. In step 610, a determination is made as to whether the flag bit in entry K indicates that segment K is compressed. If the flag bit in entry K indicates that the segment K is uncompressed, then control proceeds to step 630, where the flag bit in entry K is examined to determine whether the entry is currently stored in the FIFO. If the entry is currently stored in the FIFO, then processing is complete (the segment being accessed is already in the virtual uncompressed cache). Otherwise, at step 630, if it is determined that uncompressed segment is not in the virtual uncompressed cache, then a determination is made at step 635, to determine whether the cache miss is a read access. If the cache miss is a read access, processing is complete. However, if the cache miss is a write access, control proceeds to step 640, where a determination is made as to whether F<Tc or if the FIFO is full. If F is equal to or greater than Tc (and the FIFO is not full), directory entry K is inserted in the FIFO at step 642, and the "IN-FIFO" flag bit is set at step 643. Otherwise, if F<Tc and the FIFO is full, control proceeds to step 641, where two parallel sequences of operations is initiated. The first sequence comprises inserting directory entry K in the FIFO at step 642, and setting the "IN-FIFO" flag bit at step 643 as described herein. The second sequence of steps includes step 624, where a determination is made as to whether F<Tt. If F≧Tt, a single item is removed from the FIFO, which entails logically removing a segment from the virtual uncompressed cache, as accomplished by means of steps 625, 626, 627, and 628. Specifically, at step 625, a directory index K' is found by removing the item at the tail of the FIFO; at step 626, having found and read entry K', the "IN-FIFO" flag bit is cleared for entry K'; at step 627, segment K' is read from memory; and, at step 628, this segment is compressed and stored back to memory. Returning to step 624, if it is determined that F<Tt, then control proceeds to steps 651 through 654, which entails logically removing two segments from the virtual uncompressed cache. Specifically, at step 651, two items at the tail of the FIFO having corresponding directory indexes K' and K" are found and removed; at step 652, having found and read entries K' and K",the "IN-FIFO" flag bits are respectively cleared for these two entries; at step 653, segments K' and K" are read from memory; and at step 654, these two segments are compressed and stored back to memory.

Returning to step 610, if it is determined that for entry K, if corresponding segment K is compressed, then the process proceeds to step 615, where a determination is made as to whether F<Tc (or if the FIFO is full). If F is equal to or greater than Tc (and the FIFO is not full), segment K will be added to the virtual uncompressed cache without removing another segment from the virtual uncompressed cache. This takes place by means of steps 621, 622, and 623 as follows: first, at step 621, a segment K is read from memory, decompressed, and stored back to memory now, in uncompressed format. Next, at step 622, directory index K is inserted at the head of the FIFO; and, last, at step 623, the "IN-FIFO" flag bit for entry K is set. If at step 615, it is determined that F<Tc (or that the FIFO is full), then the process proceeds to step 620, where two parallel sequences of steps are initiated. As a preliminary matter, the first sequence initiated involves a determination at step 624 as to whether F<Tt. From step 624, as previously described, either one segment referred to by the tail of the FIFO is logically removed from the virtual uncompressed cache as described with respect to steps 625–628, or, two segments referred to by the tail of the FIFO are logically removed from the virtual uncompressed cache as described with respect to steps 651–654. The second sequence performed in parallel comprises steps for logically adding the segment K to the virtual uncompressed cache, with directory index K at the head of the FIFO as described herein with respect to steps 621, 622 and 623.

Figure 7:
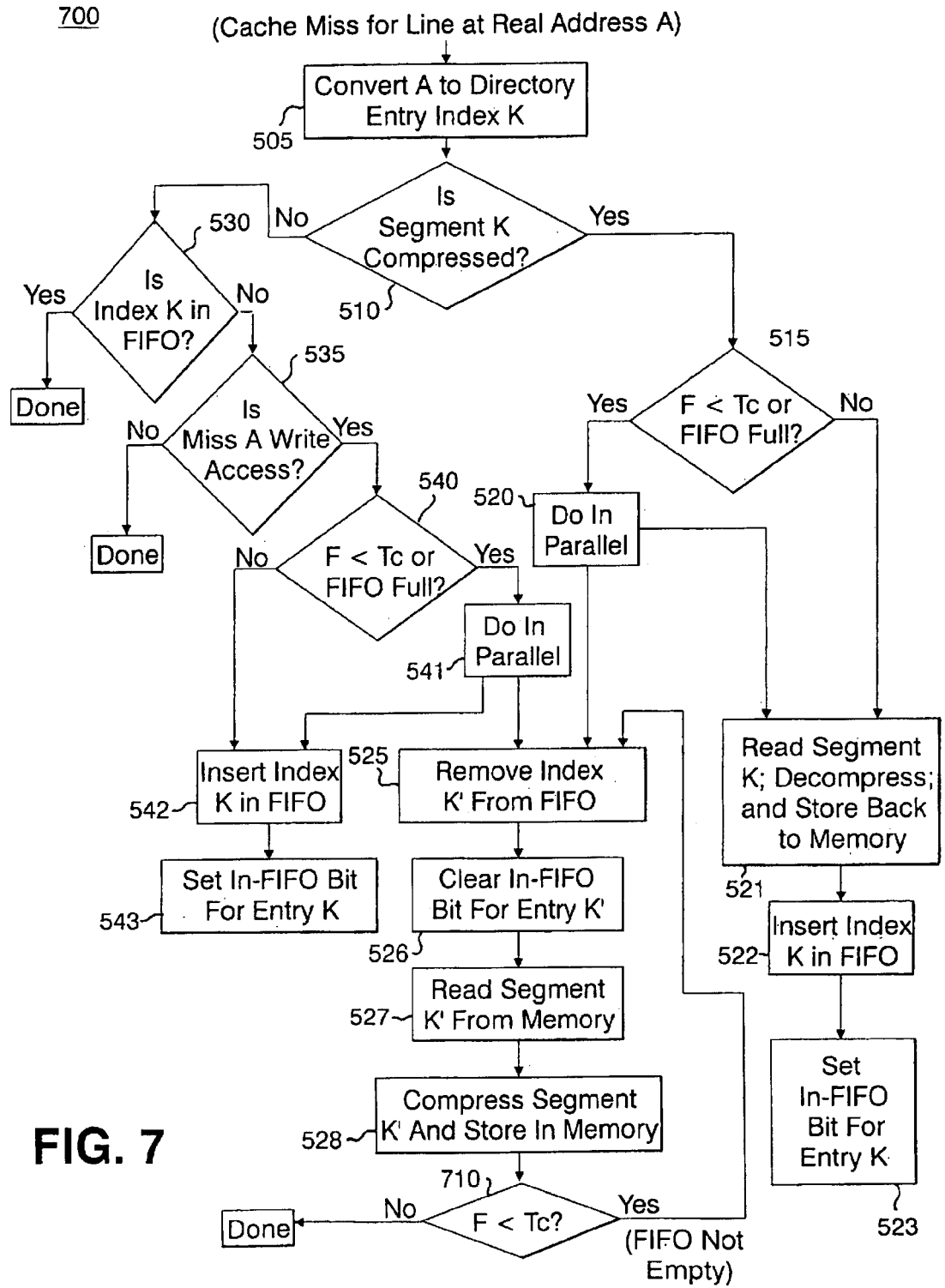

FIG. 7 illustrates a third embodiment of the control flow methodology for the compression controller of the invention. Specifically, FIG. 7 is identical to the control flow methodology previously illustrated with respect to FIG. 5 in which a single VUC size control threshold, Tc, was implemented. However, for the modification described with respect to FIG. 7, after steps 525 through 528 are performed for logically removing a segment from the VUC, an additional step 710 is performed which entails checking whether F<Tc. If F<Tc (and if the FIFO is not empty, i.e., there are still uncompressed segments in the VUC), then these process steps 525–528 are repeated, until either F is equal to or greater than Tc or the FIFO is empty.

Within the spirit and scope of the invention, mechanisms other than a FIFO list could be used to manage the virtual uncompressed cache. For example, an LRU (least-recently-used) stack data structure may be used in place of a FIFO, and the changes required are straightforward given the above example implementation using a FIFO list. Other straightforward modifications include the use of more than two thresholds; for example, in addition to Tc and Tt, a third threshold may be used which would logically remove three segments from the VUC for each segment added when F is below this threshold.

While the invention has been particularly shown and described with respect to illustrative and preformed embodiments thereof, it will be understood by those skilled in the art that the foregoing and other changes in form and details may be made therein without departing from the spirit and scope of the invention which should be limited only by the scope of the appended claims.

Having thus described our invention, what we claim as new, and desire to secure by Letters Patent is:

1. In a compressed memory system including a cache, and compressed memory having fixed size storage blocks for storing both compressed data segments and fixed size storage blocks defining a virtual uncompressed cache (VUC) for storing uncompressed data segments to enable reduced data access latency, a method for controlling the size of said VUC comprising:

a) maintaining a count of free fixed size storage blocks in said compressed memory system;

b) providing directory structure having entries for locating both uncompressed data segments and compressed data segments for handling cache miss events in said compressed memory system, wherein a CPU generated real memory address is translated into a physical memory locations using said directory, each said directory entry including a status flag indicating compressibility status of said segment and a membership status indicator for indicating storage of said data segment in said VUC; and, c) for each cache miss event, accessing a corresponding directory entry and checking status of its corresponding data segment to determine whether said entry is already compressed, wherein for a cache miss event requiring access of an uncompressed data segment indicated in said directory as not stored in said VUC, storing said uncompressed data in said VUC when said free storage blocks count is greater than or equal to a first threshold and said cache miss event is a write access, or, removing a segment from said VUC, compressing and storing said removed segment as a compressed data segment and storing said uncompressed data in said VUC when said free storage blocks count is less than said first threshold and said cache miss event is a write access, whereby the size of the VUC varies dynamically.

2. The method for controlling the size of said VUC as claimed in claim 1, wherein said step c) of accessing a corresponding directory entry further including checking said membership status of said corresponding data segment, wherein for a cache miss event, requiring access of uncompressed data segments indicated as stored in said VUC, terminating flier processing of said uncompressed data segment.

3. The method for controlling the size of said VUC as claimed in claim 2, wherein for a cache miss event requiting access of uncompressed data segments indicated as not stored in said VUC, the steps of: determining if said cache miss is a read access; and, if said cache miss is a read access terminating further processing of said uncompressed data segment.

4. The method for controlling the size of said VUC as claimed in claim 2, wherein for a cache miss event requiring access of a compressed data segment, said step d) comprises the steps of:

reading said compressed data segment, decompressing and storing said decompressed data in said VUC when said free storage blocks count is greater than a first threshold in said VUC; or, removing another segment from said VUC, compressing and storing said removed segment as a compressed data segment, and decompressing and storing said decompressed data segment in said VUC when said free storage blocks count is less than said first threshold.

5. The method for controlling the size of said VUC as claimed in claim 4, further comprising: providing a fixed length FIFO data structure comprising a list of directory indexes corresponding to recently accessed uncompressed data segments in said VUC, a corresponding membership status of said data segment being set to indicate membership of said directory index in said FIFO data structure.

6. The method for controlling the size of said VUC as claimed in claim 5, wherein said comparing step d) further comprises the step of: determining whether said FIFO is full and performing said steps of: removing another segment from said VUC, compressing and storing said removed segment as a compressed data segment, and reading, decompressing and storing said decompressed data segment in said VUC when said FIFO is not full.

7. The method for controlling the size of said VUC as claimed in claim 5, wherein said step of storing said decompressed data in said VUC further comprises:
   inserting said directory entry in said FIFO data structure and setting said membership status indicator to indicate storage in said VUC of its corresponding uncompressed data segment.

8. The method for controlling the size of said VUC as claimed in claim 5, wherein said step of removing another segment from said VUC further comprises:
   removing its corresponding directory entry from said FIFO data structure and clearing said membership status indicator.

9. The method for controlling the size of said VUC as claimed in claim 5, wherein prior to said step of removing another segment from said VUC, compressing and storing said removed segment as a compressed data segment, the steps of: comparing said current count of said free storage blocks against a second threshold for managing a size of said VUC, and performing one of: removing said another data segment, compressing and storing of said compressed data segment when said current count of said free storage blocks is less data said second threshold, or, removing more than one other data segments from said VUC, compressing and storing each of said more than one compressed data segments when said current count of said free storage blocks is greater than or equal to said second threshold.

10. The method for controlling the size of said VUC as claimed in claim 1, wherein said steps of removing, compressing and storing the removed data segment is performed in parallel with the step of storing said uncompressed data in said VUC when said free storage blocks count is less than said first threshold.

11. The method for controlling the size of said VUC as claimed in claim 10, wherein the steps of removing, compressing and storing a removed data segment is performed in parallel with the steps of reading, decompressing and storing said decompressed data segment when said free storage blocks count is less than said first threshold.

12. The method for controlling the size of said VUC as claimed in claim 1, further comprising: providing a fixed length FIFO data structure comprising a list of directory indexes corresponding to recently access uncompressed data segments in said VUC, a corresponding membership status indicator of said data segment being set to indicate membership of said directory index in said FIFO data structure.

13. The method for controlling the size of said VUC as claimed in claim 12, wherein said comparing step d) further comprises the step of: determining whether said FIFO is full and performing said steps of: removing, compressing and storing the removed data segment and said storing said uncompressed data in said VUC for a cache write access when said FIFO is not full.

14. The method for controlling the size of said VUC as claimed in claim 12, wherein said step of storing said uncompressed data in said VUC further comprises: inserting said directory entry in said FIFO data structure and setting said membership status indicator to indicate storage in said VUC of its corresponding uncompressed data segment.

15. The method for controlling the size of said VUC as claimed in claim 12, wherein said step of removing another segment from said VUC further comprises: removing its corresponding directory entry from said FIFO data structure and clearing said membership status indicator.

16. The method for controlling the size of said VUC as claimed in claim 12, wherein prior to said step of removing another segment from said VUC, compressing and storing said removed segment as a compressed data segment, the steps of: comparing said current count of said free storage blocks against a second threshold for managing a size of said VUC, and performing one of: removing said another data segment, compressing and storing of said compressed data segment when said current count of said fee storage blocks is less than said second threshold, or, removing more than one other data segments from said VUC, compressing and storing each of said more than one compressed data segments when said current count of said free storage blocks is greater than or equal to said second threshold.

17. The method for controlling the size of said VUC as claimed in claim 15, wherein said steps of removing another data segment or more than one data segments includes: removing their corresponding directory entries from said FIFO data structure and clearing each respective said membership status indicator.

18. The method for controlling the size of said VUC as claimed in claim 15, wherein said steps of removing another data segment or more than one data segments includes: removing their corresponding directory entries from said FIFO data structure and clearing each respective said membership status indicator.

19. The method for controlling the size of said VUC as claimed in claim 12, wherein after said steps of removing another segment from said VUC, compressing and storing said removed segment as a compressed data segment, performing the further step of comparing said current count of said free storage blocks against said first threshold and repeating said steps of removing another segment from said VUC, compressing and storing said removed segment as a compressed data segment until said count of said free storage blocks is less than said first threshold.

20. The method for controlling the size of said VUC as claimed in claim 1, wherein said VUC size management occurs without operating system interruption.

21. A compressed memory system for reducing data access time in a computer system including a cache and having a compressed main memory in which the unit of compression is a memory segment, the system comprising:
   a common memory area including fixed size storage blocks for storing both compressed data segments and fixed size storage blocks defining a virtual uncompressed cache (VUC) for storing uncompressed data segments;
   a mechanism for maintaining a count of free fixed size storage blocks in said compressed memory system;
   a directory mechanism having entries for locating both uncompressed data segments and compressed data segments for handling cache miss events, wherein CPU generated real memory addresses are translated into one or more physical memory locations using said directory, each said directory entry including a status flag indicating compressibility status of said segment;

control device for accessing said directory entries and checking status indication of a data segment to be accessed for said cache miss event, and enabling processing of said data segment from said common memory area according to said status indication, said control device further comparing a current count of said free storage blocks against one or more thresholds for managing a size of said VUC when handling said cache miss event, wherein for a cache miss event requiring access of an uncompressed data segment indicated in said directory as not stored in said VUC, storing said uncompressed data in said VUC when said free storage blocks count is greater than or equal to a first threshold and said cache miss event is a write access, or, removing a segment from said VUC, compressing and storing said removed segment as a compressed data segment, and storing said uncompressed data in said VUC when said free storage blocks count is less than said first threshold and said cache miss event is a write access, whereby the size of the VUC varies dynamically.

22. The compressed memory system as claimed in claim 21, wherein said control device includes one or VUC size control registers, for controlling a size of said VUC upon receipt of a cache miss event.

23. The compressed memory system as claimed in claim 22, further comprising a fixed length FIFO data structure including a list of directory indexes corresponding to recently accessed uncompressed data segments in said VUC, a corresponding membership status of said data segment being set to indicate membership of said directory index in said FIFO data structure.

24. The compressed memory system as claimed in claim 23, wherein said control device continuously updates said FIFO data structure and said status indication in a corresponding directory entry when uncompressed data segments are processed.

25. The compressed memory system as claimed in claim 21, wherein said control device enables VUC size management without operating system interruption.

\* \* \* \* \*

UNITED STATES PATENT AND TRADEMARK OFFICE
CERTIFICATE OF CORRECTION

PATENT NO. : 6,779,088 B1
DATED : August 17, 2004
INVENTOR(S) : Carolien D. Benveniste et al.

It is certified that error appears in the above-identified patent and that said Letters Patent is hereby corrected as shown below:

Title page,
Item [57], ABSTRACT,
Line 11, "solves-these" should read -- solves these --

Column 8,
Line 52, "requiting" should read -- requiring --

Column 9,
Line 41, "data" should read -- than --

Signed and Sealed this

Eleventh Day of January, 2005

JON W. DUDAS
*Director of the United States Patent and Trademark Office*